N. Petre.

Lock Latch.

No. 3,420. Reissued May 4, 1869.

Witnesses:
J. M. Power
Edmund Masson

N. Petre
By atty. A. B. Stoughton.

N. PETERS, PHOTO-LITHOGRAPHER, WASHINGTON, D. C.

United States Patent Office.

N. PETRÈ, OF NEW YORK, N. Y., FOR HIMSELF, AND ASSIGNEE OF JOSEPH H. SUGGETT.

*Letters Patent No.* 60,213, *dated July* 30, 1867; *reissue No.* 3,420, *dated May* 4, 1869.

DIVISION 1.

IMPROVEMENT IN COMBINED LATCH AND LOCK.

The Schedule referred to in these Letters Patent and making part of the same.

*To all whom it may concern:*

Be it known that I, N. PETRÈ, of the city, county, and State of New York, have invented certain new and useful Improvements in Locks; and I do hereby declare that the following is a full, clear, and exact description of the same, reference being had to the accompanying drawings making a part of this specification, in which—

Similar letters of reference, where they occur in the separate figures, denote like parts of the lock in all of the drawings.

This invention relates more particularly to that class of locks commonly known as latch-locks, the principal object of the improvements being to render the lock more secure against being picked, while it remains cheap and efficient in construction.

To enable others skilled in the art to make and use my invention, I will proceed to describe the same with reference to the drawings.

A represents the casing or box to the lock, made rectangular in shape.

B is the hub through which the spindle that carries the door-knobs passes.

The hub B is arranged to turn in the lock-casing, between its two side-plates C D, and around its periphery is notched at several points E.

F is a latch-bolt, which at one of its ends extends through the face-plate G of the lock-case.

The latch-bolt F extends inside of the casing A, and at its inner end H is made with a hook I, by which it engages with the notches in the hub B, hereinbefore referred to, and is there held by the action of the bent spring J, properly arranged for that purpose.

By turning the knob, either to the right or to the left, the hub is correspondingly turned, and through it, when the latch-bolt is hooked therewith, the said bolt will be drawn in or thrown out, or left free to be forced out by the action of the bent spring P, arranged for that purpose, as the case may be.

A barrel or cylinder, K, is arranged upon the inside of the casing A, and between its two plates C D. This barrel is arranged to turn or be turned eccentrically, within an inner casing or holder, L, of the lock, and upon one side of this barrel there is provided a raised flange, M, circular in direction, and eccentric in relation to the centre of the cylinder.

N is the key-pin placed at the centre of the circular flange M, which pin is extended through the barrel, and projects into the circular-shaped recess O, cut upon the opposite side of the barrel.

This recess O is eccentric to the centre of the barrel, and the portion of the key-pin projecting through it is exposed, and receives the key that is inserted in the key-hole of the lock-casing, there being a key-hole on each side of the lock.

The key-pin N is loose in the hub or barrel K, so that it may be turned with nippers from the outside, without, however, operating the barrel itself.

Figure 1:
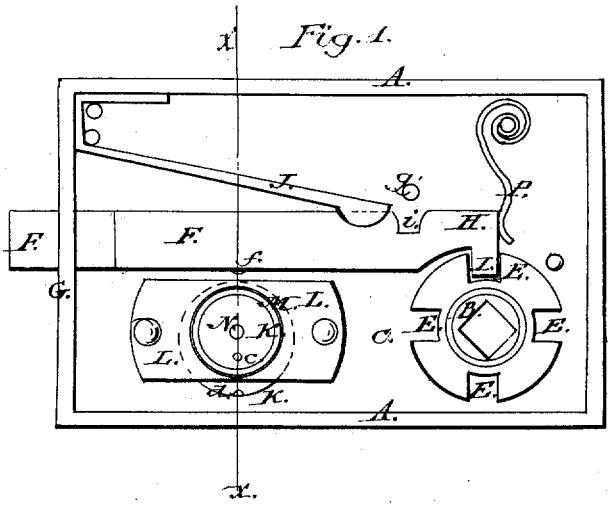
Figure 1 represents a view of the interior of the lock.
Figure 2:
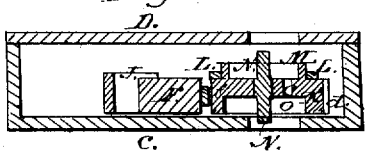
Figure 2 represents a transverse section through the same, taken at the line *x x* of fig. 1.
Figure 3:
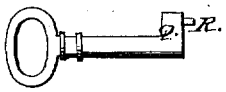
Figure 3 represents the key of the lock.

The key is shown at fig. 3, and its bit, Q, is provided with a pin, R, which, when the key is inserted in the key-hole of the lock, enters a hole, *c*, in the barrel, and causes such barrel to be turned to the right or left, according to the direction in which the key is turned, and thus, through its edge or periphery eccentric to the key-pin N, to so act upon the side of the latch-bolt as to raise it sufficiently to disengage its hook from the hub of the knob-spindle, and to there hold it when the key is drawn out or removed, and by which no movement of the bolt, through the turning of the knob-spindle, can possibly occur.

The edge of the barrel K is notched at *d*, and into this notch, when the barrel is turned to raise the bolt, a projection, *f*, on such bolt drops or enters, and is further held thereto by the action of the spring J pressing upon said bolt, and thus serving more certainly to retain the bolt in place.

There is a depression, *i*, in the upper edge of the bolt, which, when the bolt is raised up out of action with the hub, takes in a stud or pin, *g*, in the lock-case, and prevents the bolt from being moved back by any external appliance, and converts the latch into a lock.

Having thus fully described my invention,

What I claim therein as new, and desire to secure by Letters Patent, is—

1. The eccentric barrel K, in combination with the latch-bolt F and notched hub E, substantially as described, and for the purpose specified.

2. The notched eccentric, in combination with the spring-latch bolt and its projection *f* and hub B, as described, whereby the latter is prevented from engaging with the latch when locked, substantially as described, and for the purpose specified.

3. In combination with the eccentric, for raising and lowering the bolt by means of a pin-key, a loose key-pin, N, in said eccentric, so that the eccentric cannot be turned by appliances fastened on the key-pin, substantially as described.

N. PETRÈ.

Witnesses:

JOHN WALKER,

W. S. LIVINGSTON, JR.